Aug. 22, 1944.   E. H. LAND   2,356,252
SHATTERPROOF LAMINATION AND METHOD OF MANUFACTURE
Filed Dec. 28, 1938
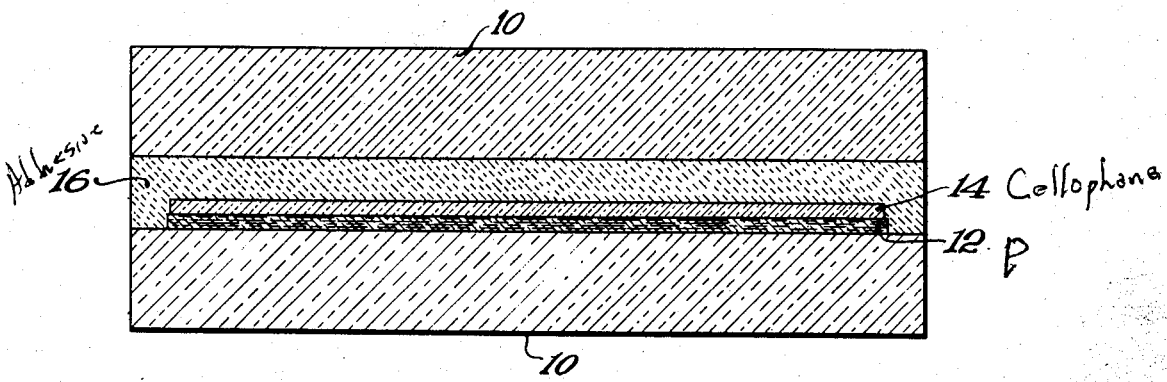
INVENTOR.
Edwin H. Land
BY
Brown & Jones
ATTORNEYS Patented Aug. 22, 1944

2,356,252

UNITED STATES PATENT OFFICE 2,356,252

SHATTERPROOF LAMINATION AND METHOD OF MANUFACTURE

Edwin H. Land, Boston, Mass., assignor to Polaroid Corporation, Dover, Del., a corporation of Delaware Application December 28, 1938, Serial No. 248,027

12 Claims. (Cl. 88—65)

This invention relates to a new lamination of a light-polarizing film between sheets of glass and to the method of manufacturing the said lamination.

An object of the invention is to provide a lamination of the shatterproof or safety glass type for use in headlight lenses, viewing visors, sunglasses, scientific instruments and the like, and comprising a polarizing film and means for suitably cementing the film between two sheets of glass or the like.

Other objects of the invention are to provide a lamination of the character described in which the polarizing film is in direct contact with one of the glass sheets and in which a layer of an adhesive is introduced between the film and the other of the glass sheets; to provide such a lamination in which the polarizing film is protected from the adhesive layer by a barrier element, for example by a thin film of regenerated cellulose; to provide such a lamination in which edge-sealing is effected to protect the polarizing film and the barrier layer from contact with moisture.

A still further object of the invention is to provide a process for the manufacture of a lamination of the character described.

The invention accordingly comprises the several steps and the relation of one or more of such steps with respect to each of the others, and the article possessing the features, properties, and the relation of elements which are exemplified in the following detailed disclosure, and the scope of the application of which will be indicated in the claims.

For a fuller understanding of the nature and objects of the invention, reference should be had to the accompanying drawing, which is a sectional view, greatly enlarged and somewhat distorted, of a lamination embodying the invention.

There has been developed an exceedingly efficient light-polarizing film which is described in greater detail in the copending applicaton of Edwin H. Land, Serial No. 233,379, filed October 5, 1938, now Patent No. 2,289,713, issued July 14, 1942. This film comprises a highly concentrated suspension of minute, needle-shaped crystals of a light-polarizing material, such for example as a herapathite-like material in a light-transmitting suspending medium such for example as a polymerized incomplete vinyl acetal resin. The polarizing films of this type may be exceedingly thin, for example they may not exceed .0003 of an inch. They are fragile and are not easily handled unless fixed to some supporting sheet. They are, however, exceedingly efficient, and it is highly desirable that they be employed in laminations of the type herein disclosed.

In effecting laminations in the past in which polarizing films have been employed, difficulties have arisen by reason of the disorientation of the polarizing crystals within the film as a result of stress exerted on the film by movement thereagainst of the adhesive layer employed in the lamination. This movement arises from the pressure exerted upon the lamination in its formation.

With the use of exceedingly thin films of light-polarizing material of the type heretofore described, this displacement of the polarizing axes of the crystals is aggravated. Even if such films could be readily handled it would be highly desirable to protect them from contact with the adhesive layers comprising the lamination to prevent flow of the adhesive during compression of the lamination from affecting the polarizing crystals.

As the said copending application points out, the polarizing layers there described may be readily formed on or transferred to thin supporting sheets, for example sheets of regenerated cellulose or the like. Cellophane, which has been freed from glycerine, is particularly adapted for the purpose of this invention, and is a preferred support for the polarizing film. It is to be understood, however, that other relatively thin, transparent supporting media may be employed.

The drawing illustrates a preferred form of the lamination of the present invention. It comprises two preferably rigid, transparent supporting sheets 10 which may preferably be of glass, a polarizing film 12 in direct contact with one of the glass sheets 10, a backing 14 for the film 12, which may preferably be a sheet of Cellophane free from glycerine to which the film has been mounted prior to its assemblage in the lamination, and a layer of an adhesive 16, which may comprise a polymerized incomplete vinyl acetal resin and which may be plasticized with any of the commercial plasticizers used with such a resin, or with castor oil. The adhesive, for example, may be the material sold commercially as "Vinal." Other materials may be used as the adhesive layer, for example, methyl acrylate, methyl methacrylate, vinyl acetate, a polyisobutylene such as the material sold as "Victanex High Molecular Weight," a product of Advance Solvents and Chemical Corp., or the like.

In preparing the lamination the polarizing film is first formed on or transferred to the barrier membrane of Cellophane or other similar material in the manner described in the said copending application. This assemblage is then placed on the glass plate with the polarizing film in direct contact with the plate. It may, for example, be applied to the glass sheet by passing a heated roll over the assemblage and pressing it against the glass. If desired a plasticizer-lubricant may be employed between the polarizing film and the glass to plasticize the film and thus facilitate its adhesion and to lubricate the interface between the film and glass and thus to eliminate air and other foreign matter. An example of a substance suitable for this purpose is a chlorinated diphenyl such as that sold under the trade name "Aroclor 1248." A layer of the adhesive is then placed upon the top of the Cellophane or other barrier film and the second glass plate then placed on the adhesive layer. The entire assemblage is then subjected to suitable temperature and pressure, and a permanent, substantially shatterproof bond effected. The pressure employed may be such as a cause the adhesive layer to flow. The Cellophane membrane acts to protect the polarizing layer from the flowing adhesive, and hence the heavy plastic is prevented from disorienting the polarizing crystals in the polarizing film. The Cellophane or other barrier layer also functions to keep the plasticizer in the plastic layer from contact with and penetrating the polarizing film. This is important in maintaining the highest efficiency of the polarizing layer.

Where the polarizing film comprises a suspension of polarizing crystals in a polymerized incomplete vinyl acetal resin, and this is a preferred form of the invention, the polarizing film adheres directly and permanently to the adjacent glass support. The film should preferably contain so little plasticizer that it does not flow at the temperature and pressure used in forming the lamination.

Under certain circumstances, as is shown in the drawing, the glass supports may extend beyond the edges of the polarizing and barrier films, and the heavy adhesive layer may extend from one to the other of the glass supporting sheets, thus effectively edge-sealing the polarizing film.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. In combination, a transparent, rigid support, a polarizing film affixed thereto, a transparent barrier film affixed to the opposite face of said polarizing film, and a relatively heavy adhesive layer affixed to and positioned intermediate said barrier layer and a second transparent, rigid support, said polarizing film adhering directly and permanently to said first-mentioned rigid support, all of the elements of said combination being permanently bonded together to provide a substantially shatterproof structure.

2. In combination, a transparent, rigid support, a polarizing film affixed thereto, a transparent barrier film affixed to the opposite face of said polarizing film, and a relatively heavy adhesive layer affixed to and positioned intermediate said barrier layer and a second transparent, rigid support, said rigid supports comprising glass sheets, said polarizing film adhering directly and permanently to said first-mentioned rigid support, all of the elements of said combination being permanently bonded together to provide a substantially shatterproof structure.

3. In combination, a transparent, rigid support, a polarizing film affixed thereto, a transparent barrier film affixed to the opposite face of said polarizing film, and a relatively heavy adhesive layer affixed to and positioned intermediate said barrier layer and a second transparent, rigid support, said heavy adhesive layer encompassing said barrier film and said polarizing film to provide an edge-sealed shatterproof lamination, said light-polarizing film adhering directly and permanently to said first-mentioned rigid support and being of smaller area than said heavy adhesive layer.

4. In combination, a transparent, rigid support, a polarizing film affixed thereto, a transparent barrier film affixed to the opposite face of said polarizing film, and a relatively heavy adhesive layer affixed to and positioned intermediate said barrier layer and a second transparent, rigid support, said barrier film being adapted to prevent plasticizer in said heavy adhesive layer from coming in contact with said polarizing film, said polarizing film adhering directly and permanently to said first-mentioned rigid support, all of the elements of said combination being permanently bonded together to provide a substantially shatterproof structure.

5. In combination, a transparent, rigid support, a polarizing film comprising a suspension of oriented polarizing crystals in a medium comprising a polymerized, incomplete vinyl acetal resin affixed thereto, a transparent barrier film affixed to the opposite face of said polarizing film, and a relatively heavy adhesive layer affixed to and positioned intermediate said barrier layer and a second transparent, rigid support, said polarizing film adhering directly and permanently to said first-mentioned rigid support, all of the elements of said combination being permanently bonded together to provide a substantially shatterproof structure.

6. In combination, a transparent, rigid support, a polarizing film affixed thereto, a transparent barrier film comprising a sheet of regenerated cellulose affixed to the opposite face of said polarizing film, and a relatively heavy adhesive layer affixed to and positioned intermediate said barrier layer and a second transparent, rigid support, said polarizing film adhering directly and permanently to said first-mentioned rigid support, all of the elements of said combination being permanently bonded together to provide a substantially shatterproof structure.

7. In combination, a transparent, rigid support, a polarizing film affixed thereto, a transparent barrier film comprising a sheet of glycerine-free, regenerated cellulose affixed to the opposite face of said polarizing film, and a relatively heavy adhesive layer affixed to and positioned intermediate said barrier layer and a second transparent, rigid support, said polarizing film adhering directly and permanently to said first-mentioned rigid support, all of the elements of said combination being permanently bonded together to provide a substantially shatterproof structure.

8. In combination, a transparent, rigid support, a polarizing film affixed thereto, a transparent barrier film affixed to the opposite face of said polarizing film, and a relatively heavy adhesive layer comprising a polymerized, incomplete vinyl acetal resin affixed to and positioned intermediate said barrier layer and a second transparent, rigid support, said polarizing film adhering directly and permanently to said first-mentioned rigid support, all of the elements of said combination being permanently bonded together to provide a substantially shatterproof structure.

9. In combination, a transparent, rigid support, a polarizing film affixed thereto, a transparent barrier film affixed to the opposite face of said polarizing film, and a relatively heavy adhesive layer comprising a plasticized, polymerized, incomplete vinyl acetal resin affixed to and positioned intermediate said barrier layer and a second transparent, rigid support, said polarizing film adhering directly and permanently to said first-mentioned rigid support, all of the elements of said combination being permanently bonded together to provide a substantially shatterproof structure.

10. A lamination comprising a glass sheet, a polarizing film comprising a suspension of oriented polarizing particles in a sheet of a polymerized incomplete vinyl acetal resin directly affixed to and in contact with one surface thereof, a transparent membrane affixed to and overlying said polarizing film, a plasticized polymerized incomplete vinyl acetal resin overlying and affixed to said membrane, and a second glass sheet overlying and affixed to said resin, said membrane being substantially impervious to the plasticizer in said resin.

11. A lamination comprising a pair of glass sheets, a layer of polymerized incomplete vinyl acetal resin adherent to the inner face of one glass sheet, a sheet of regenerated cellulose adherent to one face of said acetal resin layer, and a polarizing film comprising a suspension of polarizing crystals in a polymerized incomplete vinyl acetal resin intermediate said regenerated cellulose layer and the second glass sheet and adherent to both said cellulose layer and said second glass sheet.

12. The process of forming a lamination comprising applying a thin film of a suspension of oriented polarizing particles in a polymerized incomplete vinyl acetal resin to a transparent membrane, applying said membrane and film to a glass plate with the film between the membrane and plate, covering the exposed surface of the membrane with a plasticized polymerized incomplete vinyl acetal resin, covering the resin with a second glass plate and pressing the assemblage to effect a permanent bond between said plasticized resin and said second glass plate and between said plasticized resin and said membrane.

EDWIN H. LAND.